June 29, 1948.  A. W. CALVIN  2,444,182
CHECK VALVE
Filed Feb. 11, 1947

ALBERT W. CALVIN,
Inventor

Attorney

Patented June 29, 1948

2,444,182

UNITED STATES PATENT OFFICE 2,444,182

CHECK VALVE

Albert W. Calvin, Los Angeles, Calif.

Application February 11, 1947, Serial No. 727,775

4 Claims. (Cl. 277—60)

This invention relates generally to valves, and more particularly to a combination suction and discharge check valve device adapted for use in combination with a piston pump.

The device is designed to be coupled to the common intake and exhaust port of a piston pump, and comprises a T-shaped valve body having three ports, the central one of which is intended to be connected to the said common intake and exhaust port of the pump, and the other two of which are connected to the suction line and the discharge line. The two last mentioned ports are controlled by intake and exhaust check valves.

The general object of the invention is the provision of an improved valve of this type, the body of which may be cast in one piece, and in which machining and finishing operations are reduced to a minimum, while further objects pertain to the provision of a valve which is not only inexpensive to manufacture, but sure and effective in operation, and whose check valve elements seat and unseat almost instantly with alternate suction and pressure conditions created within the valve by the manipulation of the pump.

The invention will be best understood by referring now to the following detailed description of a present illustrative embodiment thereof, reference being had to the accompanying drawings, in which.

Figure 1:
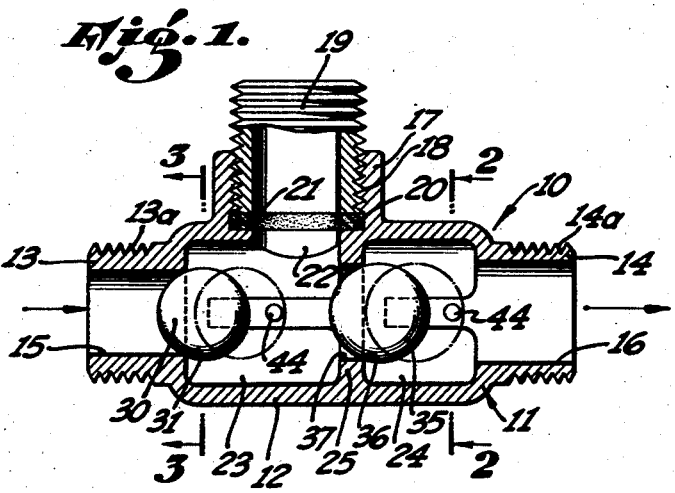
Figure 1 is a longitudinal vertical section of a check valve in accordance with the invention, being a view taken axially of Figure 2.
Figure 3:
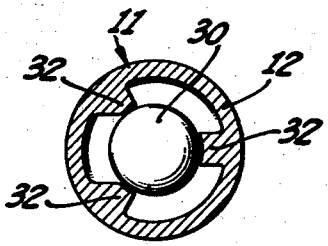
Figure 3 is a transverse section taken on line 3—3 of Figure 1.
Figure 2:
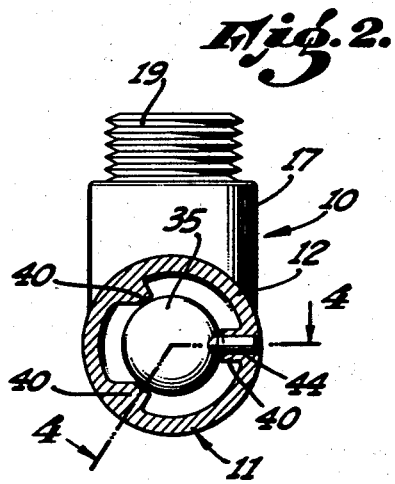
Figure 2 is a transverse section taken on line 2—2 of Figure 1.
Figure 4:
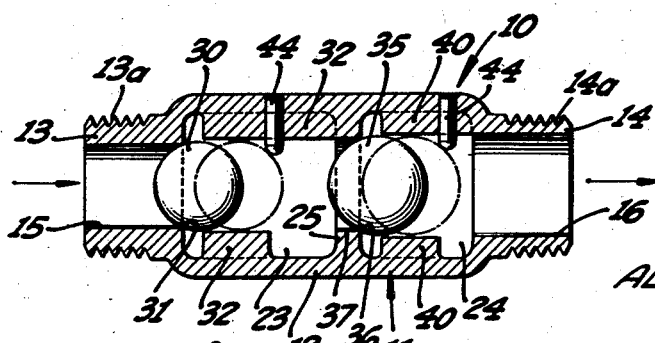
Figure 4 is a section taken on line 4—4 of Figure 2.

In the drawings the numeral 10 designates generally the check valve device of the invention, which will be seen to embody a one-piece valve body 11, generally of T-shape, and cast of some suitable metal such as bronze. Body 11 has a main tubular body 12, having at opposite ends thereof reduced tubular extensions, bosses or nipples 13 and 14, respectively, which are externally screw-threaded as indicated at 13a and 14a. These nipples 13 and 14, which may be of the same external diameter, are pierced by alined axial bores 15 and 16, respectively, the latter of which is of greater diameter than the former for a reason which will appear presently. The stem of the T is formed by a lateral tubular coupling boss 17 formed on cylindrical body portion 12, this boss having an internally screw-threaded socket 18 to receive an externally screw-threaded coupling member fragmentarily indicated at 19, and which will be understood to connect the device to the common intake and exhaust port of a conventional piston pump or the like, not necessary here to illustrate. At the bottom of socket 18 is a seat 20 for a sealing washer 21 which is engageable by the end of the coupling member 19 to effect a leak-tight fit. Extending downwardly through seat 20 and opening to the interior of tubular body portion 12 is a port 22.

The interior of the tubular body portion 12 is divided into two chambers 23 and 24 by an internal annular flange 25 formed within body portion 12 just to the right of port 22 as viewed in Figure 1. As will presently appear, the bore 15 is to become the intake port opening into the device, and the larger bore 16 is to become the exhaust port leading from the device, while, as already mentioned, the port 22 communicates with the pump; accordingly, the flange 25 is positioned within the body between the port 22 and the exhaust port 16, so as to provide the valve chamber 24 between the flange 25 and the discharge port 16, and the valve chamber 23 in constant communication with the port 22.

A check valve ball 30, preferably formed of stainless steel, is confined within the chamber 23 and is adapted to seat against the relatively sharp annular seat 31 formed at the juncture of the bore 15 with the large internal chamber 23. The ball 30 is only slightly larger than the bore 15; for example, assuming a bore 15 of ⅝-inch diameter, the ball 30 will typically be approximately 11/16-inch in diameter. The ball 30 is supported for movement along the central axis of the valve body by means of three longitudinally extending guide ribs 32 formed on the body. The ball-engaging guide faces of these ribs are arcuate, having only slightly greater radius of curvature than the balls, for instance, 1/64-inch. A clearance of 1/32-inch overall is thus afforded.

A similar but slightly larger check valve ball 35 is confined within the chamber 24, and seats against the relatively sharp annular valve seat 36 formed at the juncture of partition bore 37 with the chamber 24. For reasons which will presently appear, the bore 37 is just slightly larger than the check valve ball 30, and preferably has the same radius of curvature as the arcuate faces of guide ribs 32. The bore 37 and the arcuate faces of the guide ribs may thus be finished in a single operation of a boring tool. In the present instance, the bore 37 is 23/32-inch in diameter. The check valve bore 35 is slightly larger, having in this instance a diameter of ¾-inch.

Within chamber 24 are three longitudinally extending guide ribs 40 for the ball 35, these ribs having arcuate ball-engaging faces which have a radius of curvature just slightly greater than that of the ball 35, for instance, 1/64-inch.

The exhaust port 16 is slightly larger in diameter than the ball 35, preferably having the same radius as the arcuate ball-engaging faces on the ribs 40, i. e., 25/32-inch.

One guide rib in each of chambers 23 and 24 is extended sufficiently to accommodate a stop pin 44 set into the wall of the valve body and projecting sufficiently from the rib to form a ball stop preventing undue travel of the ball from its seat.

A feature of the device is the ease and convenience with which it may be machined and assembled. Following the initial boring of the small bore 15 at the one end of the tubular body, a slightly larger boring tool is inserted from the large end of the tubular body to form the bore 37, finish the arcuate faces on the guide ribs 32, and then engage and finish the seat 31. In engaging the seat 31 with the boring tool, a substantial cut is not taken, engagement being only sufficient to smooth and finish the ball engaging edge. A still larger boring tool is then inserted and finishes the bore 16 as well as the arcuate faces of the ribs 40, and this boring tool may then be engaged with the seat 36 to finish the same in the same manner as was the seat 31. The entire device is thus bored and finished with three simple operations, using boring tools of three sizes. The smaller ball 30 is then inserted through the bore 16, passed through the bore 37, and located at the far end of the chamber 23. The stop pin 44 is then inserted, confining the ball against rearward movement beyond the position shown in dotted lines. Next, the larger ball 35 is introduced by way of bore 16, and this ball will of course not pass through the bore 37, and therefore becomes caged between the full and dotted line positions upon installation of its corresponding stop pin 44. It should be evident that the valve as thus described is of greatly improved simplicity as compared with previously known valves of the same character which have inevitably involved a multiplicity of parts assembled with one another. The use of the close fitting guide ribs maintains the balls in axial alinement with their respective seats, and assures quick and effective seating notwithstanding use of the device in the horizontal position as illustrated. Without the guide ribs, the balls must be elevated in order to seat, and it will be evident that considerable suction would be required to accomplish that function. But with balls supported in axial alinement with the seats, relatively small suction is sufficient to move the balls onto their seats.

It will be understood that in use, a hose or the like may be coupled by any conventional hose coupling to the intake nipple 13, and that another hose may be similarly coupled to the discharge nipple 14. The first mentioned hose may run to any sump or source of water which it may be desired to pump, and the second mentioned hose will of course run to the desired point of discharge. The tubular boss 17 will be understood to be coupled, as previously described, to a piston pump. When the pump is operated to develop a suction within the valve by way of port 22, the valve ball 35 will immediately seat on its seat 36 (full line position of Figure 1, the ball 30 at the same time taking the unseated position shown in dotted lines. The suction so developed is thus stopped by check valve ball 35, but continues outwardly past check valve ball 30 into the hose connected to the nipple 13. Thus, any source of water or other liquid to which the last mentioned hose is applied will be drawn inwardly through the hose and into the chamber 23 past ball 30 and on upwardly through port 22 into the pump cylinder. On the alternate stroke of the pump, a pressure is developed within chamber 23, causing check valve ball 30 to close against its seat 31 (full line position), and causing check valve ball 35 to move away from its seat (dotted line position). The liquid previously drawn into the pump is accordingly forced outwardly past check valve ball 35 and through the hose connected to nipple 14.

A rapid and effective pumping operation is achieved, and the device has many practical uses, including the pumping out of drains or sumps, the pumping of bilge water from boats, etc.

I claim:

1. A valve comprising a one-piece T-shaped valve body having a hollow cylindrical body portion furnished at one end with an intake coupling nipple, at the other end with a discharge coupling nipple, and on one side with a laterally projecting tubular coupling boss opening thereinto, said intake nipple being pierced by a bore of a given diameter and said discharge nipple being pierced by a bore of greater diameter, both of said bores being smaller than the interior of said cylindrical portion of said valve body, an internal annular flange extending inwardly from said cylindrical body portion at a position between the ends thereof so as to divide said body portion into two chambers, said flange being located on the same side of said tubular boss as said discharge nipple, said flange having a bore whose diameter is intermediate the first and second mentioned bores, the juncture of the bore in said intake nipple with the adjacent chamber in the valve body forming a valve seat for a check valve ball, and the junction of said bore in said flange with the valve body chamber between said flange and said discharge nipple forming a valve seat for a second check valve ball, a check valve ball in the chamber between the first mentioned valve seat and said annular flange, said check valve ball being of a diameter intermediate the intake nipple bore and the bore in said flange, and a check valve ball in the chamber between the second mentioned valve seat and the discharge nipple bore, said last mentioned check valve ball being of a diameter intermediate the diameter of the bore in said flange and the discharge nipple bore.

2. A valve as defined in claim 1, having longitudinal guide ribs in the valve body chambers to support the check valve balls in axial alinement with the valve seats.

3. A valve as defined in claim 1, having longitudinal guide ribs in the valve body chambers to support the check valve balls in axial alinement with the valve seats, the guide ribs in each of said chambers having arcuate ball-engaging faces of the same radius of curvature as the next adjacent bore in the direction of the discharge nipple.

4. A valve as defined in claim 1, having longitudinal guide ribs in the valve body chambers to support the check valve balls in axial alinement with the valve seats, and valve ball stop pins inserted in the valve bodies, each projecting inwardly from one of said longitudinal guide ribs, to a position in back of a check valve ball, to limit rearward movement of the check valve balls from their seats.

ALBERT W. CALVIN.